(No Model.)

F. C. GROTHJAN.
HORSE DETACHER.

No. 560,710. Patented May 26, 1896.

Witnesses:
L. C. Hills
J. D. Kingsbury

Inventor:
Fanny C. Grothjan,
By Wm. E. Poulter,
Attorney (No Model.)

F. C. GROTHJAN.
HORSE DETACHER.

No. 560,710.

2 Sheets—Sheet 2.

Patented May 26, 1896.

Witnesses:
L. C. Hills
J. D. Kingsbury

Inventor:
Fanny C. Grothjan
By Wm. E. Boulter
Attorney

UNITED STATES PATENT OFFICE.

FANNY C. GROTHJAN, OF WASHINGTON, DISTRICT OF COLUMBIA.

HORSE-DETACHER.

SPECIFICATION forming part of Letters Patent No. 560,710, dated May 26, 1896.

Application filed March 12, 1896. Serial No. 582,854. (No model.)

*To all whom it may concern:*

Be it known that I, FANNY C. GROTHJAN, a citizen of the United States, residing at Washington, in the District of Columbia, have invented certain new and useful Improvements in Horse-Detachers; and I do declare the following to be a full, clear, and exact description of the invention, such as will enable others skilled in the art to which it appertains to make and use the same.

My invention has relation to horse-detaching devices for vehicles; and among the objects in view and sought to be accomplished by my invention is to provide a simple, strong, and inexpensive attachment adapted to be readily and quickly attached to the front axle of a vehicle and to be instantly operated to release the shafts or pole in the event of the horse running away, thus saving the occupants of the vehicle as well as the vehicle from injury.

With the above and other objects in view, all of which will presently appear, my invention consists in the novel construction, arrangement, and combination of parts, as hereinafter fully described, illustrated in the accompanying drawings, and pointed out in the appended claims.

Figure 1:
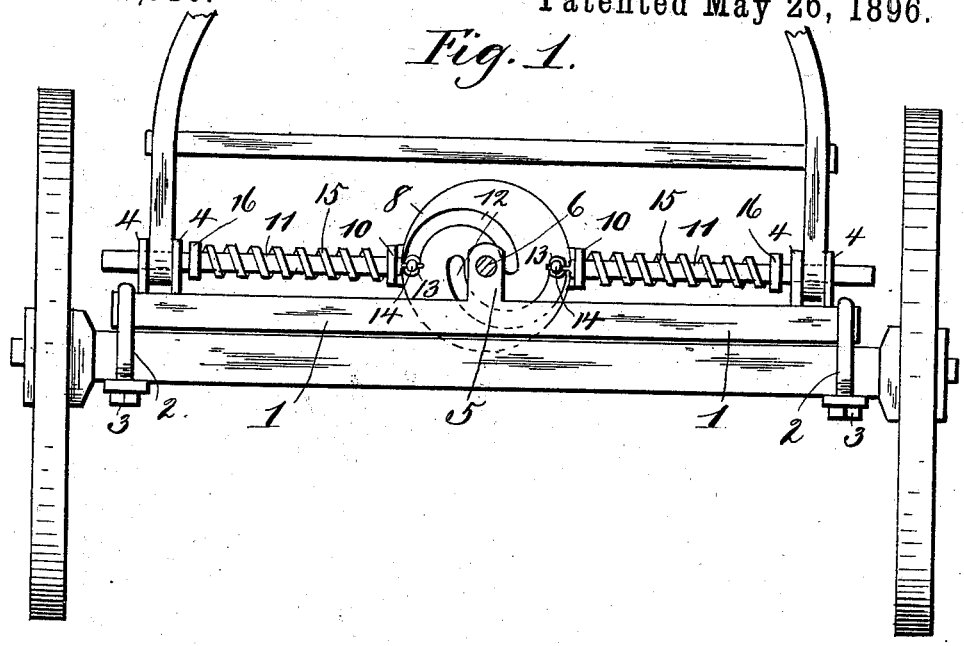
Figure 2:
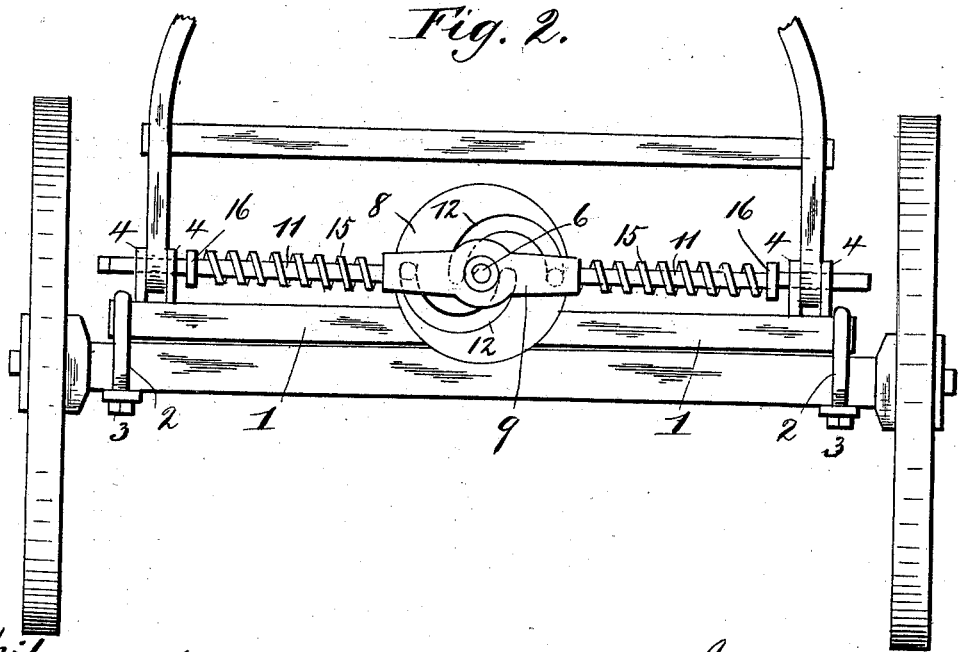
Figure 4:
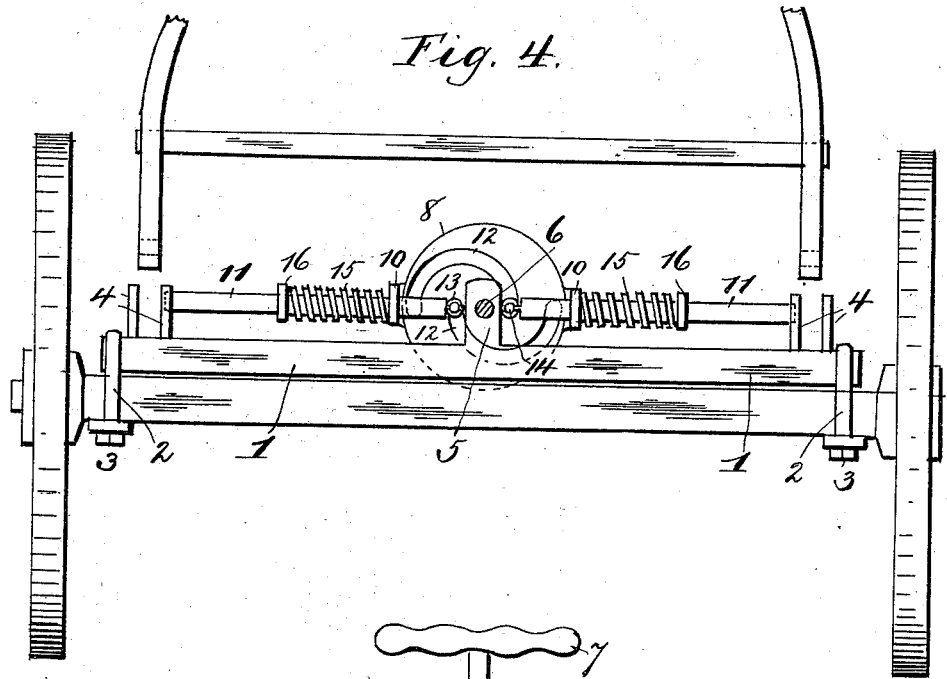
Figure 3:
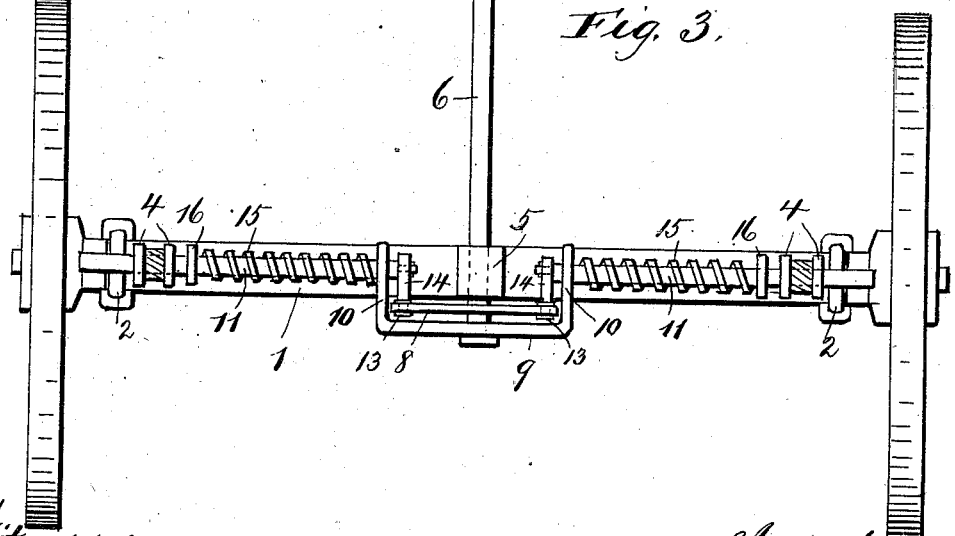

In the drawings, Figure 1 is a plan view showing a portion of a vehicle with my invention applied thereto, the operating-wheel being removed. Fig. 2 is an under side view thereof. Fig. 3 is a front view. Fig. 4 is a view similar to Fig. 1, showing the shafts as released.

My improved attachment consists of a bar 1, which is adapted to lie flat against the forward face or edge of the front axle of a vehicle. To provide for the ready attachment of the device to and removal from the axle, I provide U-shaped clips 2, which are adapted to embrace the bar 1 and the axle. Said clips have threaded ends to receive nuts 3, whereby the bar may be firmly clamped in position. To prevent endwise movement of the clips, which would release the bar from the axle, while the vehicle is in use, and thereby frighten the animal, either the axle or the bar might be recessed slightly to receive the arms of the clips.

The bar 1 is provided near each end with lugs or ears 4, between which fit the eyes on the shafts, and said lugs have alined perforations for a purpose presently apparent. The bar 1 is further provided at its center with a forwardly-extending lug 5, through which loosely passes a vertically-arranged shaft 6, carrying at its upper end the operating-wheel 7. Keyed or otherwise rigidly secured to the shaft below the lug 5 is a disk 8, while below the disk is arranged a bar 9, within which the lower end of the shaft 6 is loosely mounted. The bar 9 is provided with upwardly-bent ears 10.

11 indicate rods which are adapted to be arranged parallel with and in front of the bar 1, and said rods are further adapted to enter perforations in the ears 10 and the perforations of the ears 4 and through the eyes of the shafts to thus secure the latter to the vehicle. The rods are adapted for endwise movement, whereby they may be caused to slide out of the eyes and release the shafts, which is desirable in the event of the animal running away.

To accomplish the simultaneous and quick operation of the rods 11 to effect the described purpose, I provide the disk with curved slots 12, arranged relatively to each other, as shown, and within said slots are arranged rollers 13, to the studs 14 of which are rigidly secured the inner ends of the rods 11.

When the vehicle is in use and the shafts secured to the vehicle by the rods 11 entering the eyes of the shafts, the parts will be in the relative position indicated in Figs. 1, 2, and 3. Now should the animal run away the occupant of the vehicle will turn the wheel in the proper direction to cause the rollers to ride within the slots of the disk and thus draw the rods 11 simultaneously inward to free their outer ends from the eyes of the shafts, when the latter will be freed from the vehicle. When the shafts are released, the parts are in the position indicated in Fig. 4, the rollers being then at the opposite end of the slots.

The operating-shaft may be extended through the bottom of the vehicle adjacent to and upon the inner side of the dashboard, or (and as is preferable) they may pass up in front of the dashboard close to the same and sufficiently high to be easily reached by the occupants.

I prefer to employ a wheel instead of a crank-handle for operating the shaft 6, for the reason that there is less liability to turn the wheel accidentally when getting into and out of the vehicle than would be the case were a crank-handle employed.

In order that the rods 11 may be automatically moved outwardly to again engage the eyes of the shafts after the operating-wheel has been given a partial reverse turn, I employ coiled springs 15, which encircle the rods 11 and bear against the bent ends 10 of the rod 9 and collars 16 on the rods.

It will be noted that by my mode of attaching the device to the axle of a vehicle said axle is not weakened in any way, and the attaching means permit of the ready application of the device to and removal from the axle when desired.

What I claim, and desire to secure by Letters Patent, is—

1. The herein-described attachment for vehicles, consisting of the bar 1, the perforated ears 4 adjacent to the ends of said bar, the bar 9 having upwardly-bent perforated ends 10 the operating-shaft mounted in the bar 1, the disk 8 mounted rigidly on the shaft between the bars 1 and 9 and having semicircular slots, the rods 11 slidingly mounted in the said ends 10 and the ears 4, and rollers carried at the inner ends of the rods 11 and engaging within the slots, all as specified.

2. The combination with the front axle of a vehicle of the described attachment consisting of the bar 1 arranged against the forward face or edge of the axle, the perforated ears 4 adjacent to the ends of said bar, the bar 9 having upwardly-bent perforated ends 10, the operating-shaft mounted in the bar 1, the disk 8 mounted rigidly on the shaft between the bars 1 and 9 and having semicircular slots, the rods 11 slidingly mounted in the said ends 10 and the ears 4, rollers carried at the inner ends of the rods 11 and engaging within the slots, and clips 2 embracing the bar 1 and the axle and nuts threaded upon the ends of the arms of the clips, all as specified.

3. The herein-described attachment for vehicles consisting of the bar 1, the perforated ears 4 adjacent to the ends of said bar, the bar 9 having upwardly-bent perforated ends 10, the operating-shaft mounted in the bar 1, the disk 8 mounted rigidly on the shaft between the bars 1 and 9 and having semicircular slots, the rods 11 slidingly mounted in the said ends 10 and the ears 4, rollers carried at the inner ends of the rods 11 and engaging within the slots, collars on the rods 11 between the ends 10 and the ears 4, and coiled springs encircling the rods and bearing against the said collars and ears, as specified.

In testimony whereof I affix my signature in presence of two witnesses.

FANNY C. GROTHJAN.

Witnesses:
E. P. BURKET,
W. E. BOULTER.